March 31, 1953    L. H. BALMAIN    2,633,170
MEAT CHOPPER WITH CONDIMENT ADDING MEANS
Filed Sept. 25, 1950
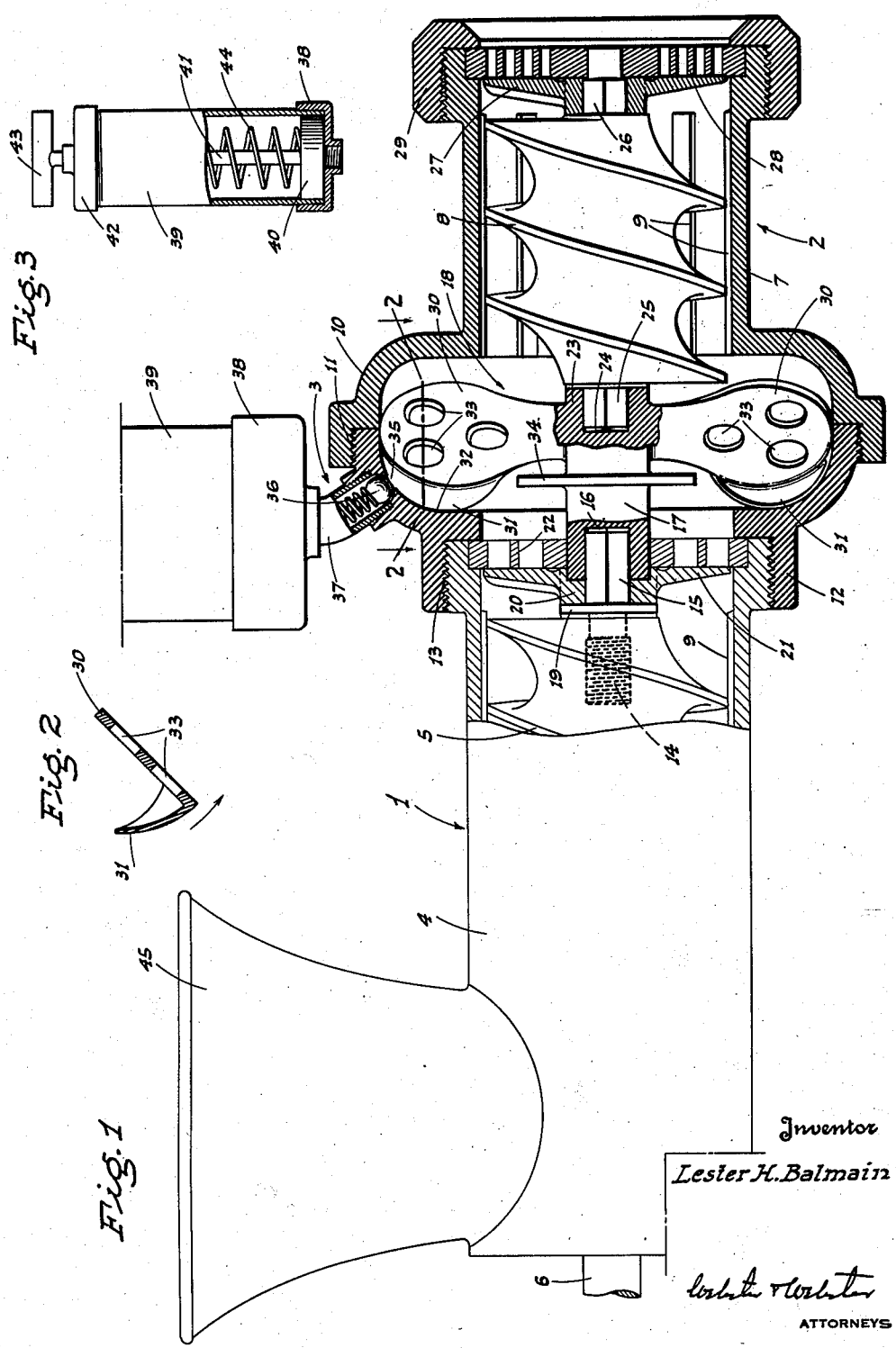
Inventor
Lester H. Balmain
ATTORNEYS Patented Mar. 31, 1953

2,633,170

UNITED STATES PATENT OFFICE 2,633,170

MEAT CHOPPER WITH CONDIMENT ADDING MEANS

Lester H. Balmain, Fair Oaks, Calif., assignor of one-half to A. C. Turpen and one-half to John L. Walden, both of Sacramento, Calif.

Application September 25, 1950, Serial No. 186,639

4 Claims. (Cl. 146—187)

This invention is directed to, and it is an object to provide, a novel meat chopper for producing ground meat or hamburger.

Another object of the invention is to provide a meat chopper which includes, in novel combination, dual meat chopping units having a chopped meat and condiment mixing chamber interposed between such units.

A further object of the invention is to provide a novel mixing and feeding impellor in said chamber, and such impellor including a hub structure which connects, and serves as the driving medium, between the primary meat chopping unit and the secondary meat chopping unit.

An additional object of this invention is to provide an automatic device for delivering a regulated quantity of a condiment into the chamber, between the chopping units, for mixing with the chopped meat therein.

Still another object of the invention is to provide a meat chopper which is designed for ease and economy of manufacture.

A further object of the invention is to provide a practical and effective meat chopper, and yet one which will be exceedingly effective for the purpose for which it is designed.

These objects are accomplished by means of such structure and relative arrangement of parts as will fully appear by a perusal of the following specification and claims.

In the drawings:

Fig. 1 is a side elevation, mainly in section, of the improved meat chopper.

Fig. 2 is a fragmentary cross section on line 2—2 of Fig. 1; the view being taken through one of the impellor vanes, and illustrating the attached sweep.

Fig. 3 is an elevation, detached and partly in section, of the condiment feed cylinder.

Referring now more particularly to the characters of reference on the drawings, the meat chopper comprises, in novel combination, a primary meat chopping unit, indicated generally at 1, and a secondary meat chopping unit, indicated generally at 2; there being a meat and condiment mixing unit, indicated generally at 3, interposed between the units 1 and 2 and working in the flow path of the chopped meat moving between said units.

The primary meat chopping unit 1 includes a main, horizontally disposed cylinder 4, having a feed screw 5 running therein, and which feed screw is driven by a shaft 6. The shaft 6 is actuated from a suitable source of power, such as an electric motor and gear box (neither being shown).

The secondary meat chopping unit 2 includes a secondary cylinder 7 disposed axially in alinement beyond the main cylinder 4, and likewise having a feed screw 8 therein; the feed screws 5 and 8 running on circumferentially spaced, longitudinally extending guide bars 9 in the corresponding cylinders.

Intermediate adjacent ends of the main cylinder 4 and secondary cylinder 7, the device includes a radially enlarged, annular mixing chamber 10 comprised of two annular halves threaded together, as at 11; the forward half being integral with the secondary cylinder 7, while the rearward half is formed with a coupling ring 12 threaded on the front end of the main cylinder 4, as at 13. With this arrangement the meat chopping units 1 and 2, together with the mixing chamber 10, are normally in fixed unitary relationship.

The feed screw 5 has an axial stem 14 threaded thereinto at the front; such stem being non-circular at its forward end portion 15, which portion removably seats in a corresponding rearwardly opening bore 16 in a rearwardly elongated hub 17 of an opposed diagonal vane impellor, indicated generally at 18, which is disposed for rotation in the mixing chamber 10.

The axial stem 14 is formed with a radial collar 19 which abuts against the hub 20 of a multi-blade cutter 21 which is supported by the stem portion 15, and which cutter 21 works against a perforate sizing disc 22 engaged in the front end of the main cylinder 4 in surrounding relation to the hub 17.

The opposed diagonal vane impellor 18 includes a short forwardly projecting hub 23 having a non-circular socket 24 which opens axially forward, and receives—in matching relation—an axial stem 25 which projects rearwardly from the feed screw 8. At its forward end the feed screw 8 includes another non-circular axial stem 26 which drives an adjacent multi-blade cutter 27 which runs against a perforate sizing disc 28 held in place in the outer end of the secondary cylinder 7 by a coupling ring 29.

The opposed diagonal vane impellor 18 includes generally oval or egg-shaped vanes 30 whose outermost ends run extremely close to the internal periphery of the annular mixing chamber 10, although the opposite edges of each such vane are in clearance relation to corresponding sidewalls of such chamber.

A segmental, arcuate sweep 31 trails from the leading edge of each vane 30 and runs in close matching relationship to the adjacent rounded corner 32—i. e. the rear annular corner—of the mixing chamber 10.

Additionally, each vane 30 is formed with a plurality of perforations 33, and the rearwardly elongated hub 17 carries a circular radial baffle 34.

A port 35 opens into the mixing chamber 10 at the top and into the rounded corner 32; there being a spring-pressed ball check valve 36 which normally closes such port and projects slightly into the mixing chamber 10 through said port.

The ball check valve 36 is carried in a fitting 37, which fitting is in threaded communication with the lower screw cap 38 of a condiment feeding cylinder 39 which upstands above the mixing chamber 10.

The condiment feeding cylinder 39 includes a plunger or piston 40 on an upstanding piston rod 41 which slidably extends through an upper screw cap 42 and thereabove is fitted with a handle 43. The piston 40 is normally urged downwardly by a compression spring 44 surrounding the rod 41 between the piston 40 and upper screw cap 42.

When the meat chopper is in operation, the feeding cylinder 39 has a quantity of condiment therein, either fluid, paste, or dry, which condiment is constantly urged downwardly into the fitting 37 by the spring-pressed piston 40.

The meat to be chopped is first fed into the main cylinder 4 from a hopper 45, and thence is advanced in said cylinder 4 by the feed screw 5, being chopped by the cutter 21 and forced through the perforating sizing disc 22.

From said disc the initially chopped meat impinges against the baffle 34 and deflects radially outwardly into the mixing chamber 10, whence it is picked up and thoroughly mixed by the opposed diagonal vane impellor 18.

As such impellor rotates, the sweeps 31 recurringly strike and depress the spring-pressed ball check valve 36, permitting a regulated quantity of the condiment to enter the chamber 10, whence it is effectively mixed with the chopped meat therein by the impellor 18, including the perforate vanes 30.

In addition to their action of controlling the spring-pressed ball check valve 36, the sweeps 31 constantly work in the rounded rear corner 32 of the chamber to prevent the chopped meat from clogging in the chamber 10, and assuring that it constantly delivers to the vanes 30 for advance.

The chopped meat, after being thoroughly mixed in the chamber 10, and at which time a condiment is mixed therein, as aforesaid, then advances into the secondary cylinder 7 and is carried forward by the feed screw 8; a secondary meat chopping action then resulting by reason of the cutter 27 chopping the meat and forcing it through the perforate sizing disc 28.

With the above described meat chopper meat can be effectively chopped, and a condiment added, in a single operation, and—by reason of the dual meat chopping units—it is not necessary to repass the chopped meat through the device; the chopped meat as delivered from the perforate sizing disc 28 of the secondary meat chopping unit being fully chopped and ready for use.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A meat chopper comprising a meat chopping unit including a cylinder having a driven feed screw therein, and a meat chopping assembly in the forward portion of the cylinder; a mixing chamber on the forward end of the cylinder adapted to receive chopped meat therefrom and to discharge said meat from the opposite end, means operative to feed a condiment into the chamber, a chopped meat and condiment mixing impeller in the chamber, the impeller including a plurality of diagonal vanes, the sides of which are disposed in clearance relation to corresponding sides of the chamber, a driving connection between the feed screw and impeller which includes a hub on the impeller, and a baffle in the chamber radiating from the hub between the meat chopping assembly and said vanes.

2. In a meat chopper having a cylindrical body unit provided with spaced rotary meat chopping and advancing elements and a mixing chamber between said elements; a condiment holder outside the mixing chamber, a duct from the holder to the chamber adjacent the top and one side thereof, a spring-closed valve element in the duct projecting into the mixing chamber and opening away from the same, and means in the mixing chamber connected to one of the rotary chopping elements to intermittently engage and depress the valve element to an open position upon rotation of the chopping element.

3. A structure as in claim 2 in which said means comprises a rotor having diagonal vanes, one peripheral edge of which is positioned to sweep past and depress the valve element.

4. A structure as in claim 2 in which said means comprises a rotor having diagonal vanes and a sweep rigid with and trailing from the leading edge of each vane; the outer face of each sweep running in close proximity to and substantially matching the portion of the inner face of the mixing chamber from which said valve element projects.

LESTER H. BALMAIN.

REFERENCES CITED

The following references are of record in the file of this patent:

UNITED STATES PATENTS

| Number | Name | Date |
| --- | --- | --- |
| 225,213 | Dieryckx | Mar. 9, 1880 |
| 465,796 | Wittemann | Dec. 22, 1891 |
| 1,110,515 | Sturgis | Sept. 15, 1914 |
| 1,115,062 | Fuller | Oct. 27, 1914 |
| 1,733,441 | Barks | Oct. 29, 1929 |
| 2,229,845 | Gold | Jan. 28, 1941 |
| 2,377,069 | Brubaker | May 29, 1945 |
| 2,591,894 | Voges | Apr. 8, 1952 |